US012208715B2

United States Patent
Kobayashi et al.

(10) Patent No.: US 12,208,715 B2
(45) Date of Patent: Jan. 28, 2025

(54) SEATBACK FRAME AND VEHICLE SEAT

(71) Applicants: NHK SPRING CO., LTD., Yokohama (JP); SUBARU CORPORATION, Tokyo (JP)

(72) Inventors: Daisuke Kobayashi, Yokohama (JP); Kensuke Yoshiga, Yokohama (JP); Akihiko Mizuno, Yokohama (JP); Fumito Kitanaka, Tokyo (JP); Kenji Nagumo, Tokyo (JP)

(73) Assignees: NHK Spring Co., Ltd., Yokohama (JP); Subaru Corporation, Tokyo (JP)

( * ) Notice: Subject to any disclaimer, the term of this patent is extended or adjusted under 35 U.S.C. 154(b) by 102 days.

(21) Appl. No.: 18/145,281

(22) Filed: Dec. 22, 2022

(65) Prior Publication Data

US 2023/0202359 A1 Jun. 29, 2023

(30) Foreign Application Priority Data

Dec. 27, 2021 (JP) .................. 2021-213144

(51) Int. Cl.
*B60N 2/42* (2006.01)
*B60N 2/427* (2006.01)
*B60N 2/22* (2006.01)

(52) U.S. Cl.
CPC ....... *B60N 2/4228* (2013.01); *B60N 2/42709* (2013.01); *B60N 2/22* (2013.01)

(58) Field of Classification Search
CPC . B60N 2/4228; B60N 2/42709; B60N 2/4221
See application file for complete search history.

(56) References Cited

U.S. PATENT DOCUMENTS

| | | | |
|---|---|---|---|
| 8,727,438 B2 * | 5/2014 | Nitsuma ................. | B60N 2/68 297/216.13 |
| 9,428,087 B2 * | 8/2016 | Adachi .................... | B60N 2/64 |
| 2016/0009210 A1 | 1/2016 | Sasaki et al. | |

FOREIGN PATENT DOCUMENTS

| | | | |
|---|---|---|---|
| JP | 6364309 B2 | 7/2018 | |
| JP | 6387258 B2 | 9/2018 | |

* cited by examiner

*Primary Examiner* — Syed A Islam
(74) *Attorney, Agent, or Firm* — Knobbe, Martens, Olson & Bear, LLP

(57) ABSTRACT

A seatback frame including left and right side frames, a lower frame, and a sacrum support section. The left and right side frames extend in a seat up-down direction inside left and right side portions of a seatback of a vehicle seat. The lower frame spans between lower end portions of the left and right side frames. The sacrum support section extends from a lower end portion of the lower frame toward a seat front side and supports a sacral region of a seated occupant from a seat rear side. A weakened portion that is weakened by a load from the seat front side is provided to the sacrum support section.

6 Claims, 12 Drawing Sheets

SEATBACK FRAME AND VEHICLE SEAT

CROSS-REFERENCE TO RELATED APPLICATION

This application is based on and claims priority under 35 USC 119 from Japanese Patent Application No. 2021-213144 filed on Dec. 27, 2021, the disclosure of which is incorporated by reference herein.

BACKGROUND

Technical Field

The present disclosure is related to a seatback frame and a vehicle seat.

Related Art

In a seat described in Japanese Patent No. 6364309, a pair of side frames are provided at the two seat width direction sides of a seatback frame configuring framework of a seatback. A sacrum support member to support the sacral region of a seated occupant spans between the pair of side frames. Swaying of the seated occupant in a roll direction during vehicle travel is suppressed thereby, and a sitting posture is stabilized.

In the seatback frame described in Japanese Patent No. 6387258, a back face panel (lower frame) formed from sheet metal spans between rear end portions of a lower section of the left and right side frames. This lower frame includes an undulating shaped section with indentations and protrusions bent alternately along the seat width direction. The undulating shaped section is stretched when excessive load from an occupant is input to the lower frame during a rear-end collision of the vehicle. The load is accordingly dissipated, and tensile load imparted to fixings between the lower frame and the left and right side frames is reduced. As a result thereof, breakage of other members, such as these fixings and the left and right side frames, can be prevented or suppressed.

SUMMARY

The related art described in Japanese Patent No. 6364309 does not consider the protection of seated occupants during a rear-end collision of a vehicle. Moreover, the related art described in Japanese Patent No. 6387258 does not consider posture maintenance of the seated occupant during normal vehicle travel.

In consideration of the above circumstances, an object of the present disclosure is to obtain a seatback frame and a vehicle seat capable of achieving both seated occupant posture maintenance during normal vehicle travel and protection of the seated occupants during a vehicle rear-end collision.

A seatback frame of a first aspect of the present disclosure includes left and right side frames that extend in a seat up-down direction inside left and right side portions of a seatback of a vehicle seat, a lower frame spanning between lower end portions of the left and right side frames, and a sacrum support section that extends from a lower end portion of the lower frame toward a seat front side, that supports a sacral region of a seated occupant from a seat rear side, and that is provided with a weakened portion that is weakened by a load from the seat front side.

In the seatback frame of the first aspect, the left and right side frames extend in the seat up-down direction inside left and right side portions of the seatback of the vehicle seat. The lower frame spans between lower end portions of the left and right side frames. The sacrum support section extends from the lower end portion of the lower frame toward the seat front side. The sacral region of the seated occupant is supported by the sacrum support section from a seat rear side. Swaying of the seated occupant in the roll direction during normal vehicle travel is accordingly suppressed thereby, and the sitting posture is maintained. The weakened portion that is weakened by a load from the seat front side is provided to the sacrum support section. The sacrum support section is accordingly deformed at the weakened portion by load input from the sacral region of the seated occupant to the sacrum support section during a vehicle rear-end collision. Energy due to the inertia of the seated occupant is absorbed thereby, and a moment imparted to the seatback frame is reduced. As a result a phenomenon in which the seated occupant gradually rises diagonally toward the vehicle rear is suppressed from occurring, enabling the seated occupant to be protected.

A seatback frame of a second aspect of the present disclosure is the first aspect wherein the sacrum support section is configured from sheet metal and includes a fixed portion fixed to a lower surface of the lower frame and a forward extension portion extending from the fixed portion toward the seat front side, and the weakened portion is provided at a seat front-rear direction intermediate portion of the forward extension portion.

In the seatback frame of the second aspect the sacrum support section configured from sheet metal includes the fixed portion and the forward extension portion. The fixed portion is fixed to the lower surface of the lower frame, and the forward extension portion extends from the fixed portion toward the seat front side. During a vehicle rear-end collision, the weakened portion provided at the seat front-rear direction intermediate portion of the forward extension portion is deformed by load from the sacral region of the seated occupant. Thus the degrees of freedom are increased for setting the shape and the like of the weakened portion due to the weakened portion being provided to the forward extension portion of the sacrum support section made from sheet metal, and the deformation load of the weakened portion is easily adjusted.

The seatback frame of a third aspect of the present disclosure is the second aspect wherein the weakened portion includes a bent portion where the seat front-rear direction intermediate portion of the forward extension portion is bent so as to configure a projection toward one side in the seat up-down direction.

In the seatback frame of the third aspect, the sacrum support section configured from sheet metal includes the fixed portion and the forward extension portion. The bent portion where the seat front-rear direction intermediate portion of the forward extension portion is bent so as to configure the projection toward one side in the seat up-down direction is provided as the weakened portion. During a vehicle rear-end collision, stress due to load from the sacral region of the seated occupant is concentrated at the bent portion, and the bent portion deforms (buckles). The bent portion accordingly serves as the weakened portion, enabling the weakened portion to have a simple configuration.

A seatback frame of a fourth aspect of the present disclosure is the second aspect or the third aspect, wherein a through hole is formed at the weakened portion so as to pierce the weakened portion in the seat up-down direction.

In the seatback frame of the fourth aspect, the sacrum support section configured from sheet metal includes the fixed portion and the forward extension portion. The through hole is formed at the weakened portion provided at the seat front-rear direction intermediate portion of the forward extension portion so as to pierce the weakened portion in the seat up-down direction. The deformation load of the weakened portion is easily adjusted by a setting change such as in the shape and number of the through hole(s).

A seatback frame of the fifth aspect of the present disclosure is the second aspect wherein the sacrum support section includes a vertical extension portion extending from a front edge of the forward extension portion toward one side in the seat up-down direction.

In the seatback frame of the fifth aspect of the present disclosure, the sacrum support section configured from sheet metal includes the fixed portion, the forward extension portion, and the vertical extension portion. The vertical extension portion extends from the front edge of the forward extension portion toward the seat up-down direction one side. The sacral region of the seated occupant is supported by the front face of the vertical extension portion such that discomfort of the seated occupant is lessened.

A seatback frame of a sixth aspect is the first aspect wherein a reclining rod spans between the lower end portions of the left and right side frames, and the sacrum support section is disposed at a seat lower side with respect to the reclining rod.

In the seatback frame of the sixth aspect the reclining rod spans between the lower end portions of the left and right side frames. The sacrum support section extending from the lower end portion of the lower frame toward the seat front side is disposed at the seat lower side with respect to the reclining rod. The sacral region of the seated occupant can accordingly be supported appropriately due to the sacrum support section being disposed at this height.

A vehicle seat of a seventh aspect includes a seat cushion including a seat cushion frame, and a seatback including the seatback frame of the first aspect in which each of the lower end portion of the left and right side frames is connected to a rear end portion of the seat cushion frame.

In the vehicle seat of the seventh aspect, the lower end portion of each of the left and right side frames included in the seatback frame are connected to the rear end portions of the seat cushion frame included in the seat cushion. The seatback frame is the seatback frame of the first aspect, and so the operation and advantageous effects described above are obtained.

As explained above, the seatback frame and vehicle seat according to the present disclosure are able to achieve both posture maintenance of the seated occupant during normal vehicle travel, as well as protection of the seated occupant during a vehicle rear-end collision.

BRIEF DESCRIPTION OF THE DRAWINGS

Exemplary embodiments of the present disclosure will be described in detail based on the following figures, wherein.

DETAILED DESCRIPTION

Figure 1:
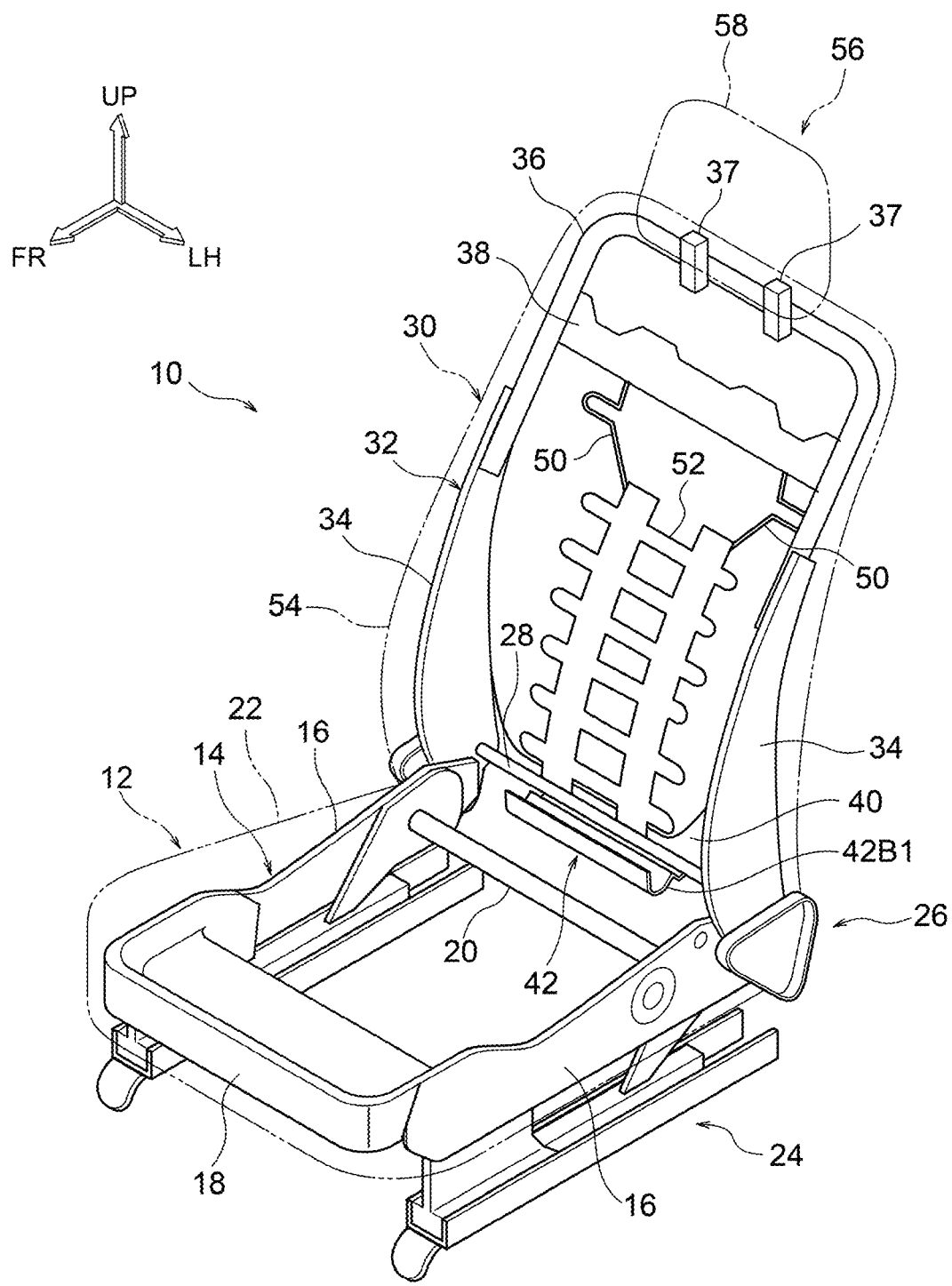
FIG. 1 is a perspective view illustrating a vehicle seat according to an exemplary embodiment.

Explanation follows regarding a seatback frame 32 and a vehicle seat 10 according to an exemplary embodiment of the present disclosure, with reference to FIG. 1 to FIG. 15. Note that sometimes some of the reference numerals are omitted in the drawings to make viewing the drawings clearer. Moreover, an arrow FR indicates a vehicle front direction, an arrow UP indicates a vehicle upward direction, and an arrow RH indicates a vehicle right direction as appropriate in the drawings. When front-rear, left-right, and up-down directions are used in the following explanation, unless particularly stated otherwise, these refer to front-rear in the vehicle front-rear direction, left-right in the vehicle left-right direction (vehicle width direction), and up-down in the vehicle up-down direction.

As illustrated in FIG. 1, the vehicle seat 10 according to the present exemplary embodiment includes a seat cushion 12, a seatback 30, and a headrest 56. The seat cushion 12 supports the pelvic region and thighs of a seated occupant, the seatback 30 supports the lumber region and back region of the seated occupant, and the headrest 56 supports the head of the seated occupant. The seat cushion 12 includes a seat cushion frame 14 that is a framework member, the seatback 30 includes a seatback frame 32 that is a framework member, and the headrest 56 includes a headrest frame (omitted in the drawings) that is a framework member. Note that FIG. 1 illustrates the vehicle seat 10 schematically.

Pad members (omitted in the drawings) covered by covers 22, 54, 58 are respectively attached to the seat cushion frame 14, the seatback frame 32, and the headrest frame. The front-rear direction, left-right direction (width direction), and up-down direction of the vehicle seat 10 are aligned with the front-rear, left-right, and up-down directions of the vehicle.

The seat cushion frame 14 includes a left-right pair of side frames 16 disposed at left-right side portions of the seat cushion 12 and extending along the seat front-rear direction, a front frame 18 spanning between upper end portions at a front portion of the left and right side frames 16, and a rear frame 20 spanning between rear end portions of the left and right side frames 16. Non-illustrated seat cushion springs are spanned between the front frame 18 and the rear frame 20. The pad member of the seat cushion 12 is elastically supported from the seat lower side by these seat cushion springs.

The left and right side frames 16 are, for example, formed in elongated shapes by press forming sheet metal, and are disposed at an orientation such that their length directions are along the seat front-rear direction, and their thickness directions are along the seat width direction. The front frame 18 is, for example, formed in a substantially rectangular shape from sheet metal, and is disposed at an orientation such that its thickness direction is along the seat up-down direction, and seat width direction two end portions of the front frame 18 are fixed to respective front portions of the left and right side frames 16 by a method such as welding. The rear frame 20 is, for example, formed from a metal pipe, and is disposed at an orientation such that its axial direction is along the seat width direction, with the seat width direction two end portions of the rear frame 20 connected, so as to allow rotation, to rear end portions of the left and right side frames 16 by a method such as crimping.

The left and right side frames 16 are connected to a vehicle body floor section through a known seat slider mechanism 24, with the vehicle front-rear direction position of the left and right side frames 16 adjustable with respect to the vehicle body floor section. The seatback frame 32 is connected to rear end portions of the left and right side frames 16 through a known reclining mechanism 26, enabling the seatback frame 32 to be reclined. Note that in the present exemplary embodiment the front-rear, left-right, and up-down directions indicated for the seatback 30 refer to directions in a state in which the seatback 30 is upright with respect to the seat cushion 12.

Figure 2:
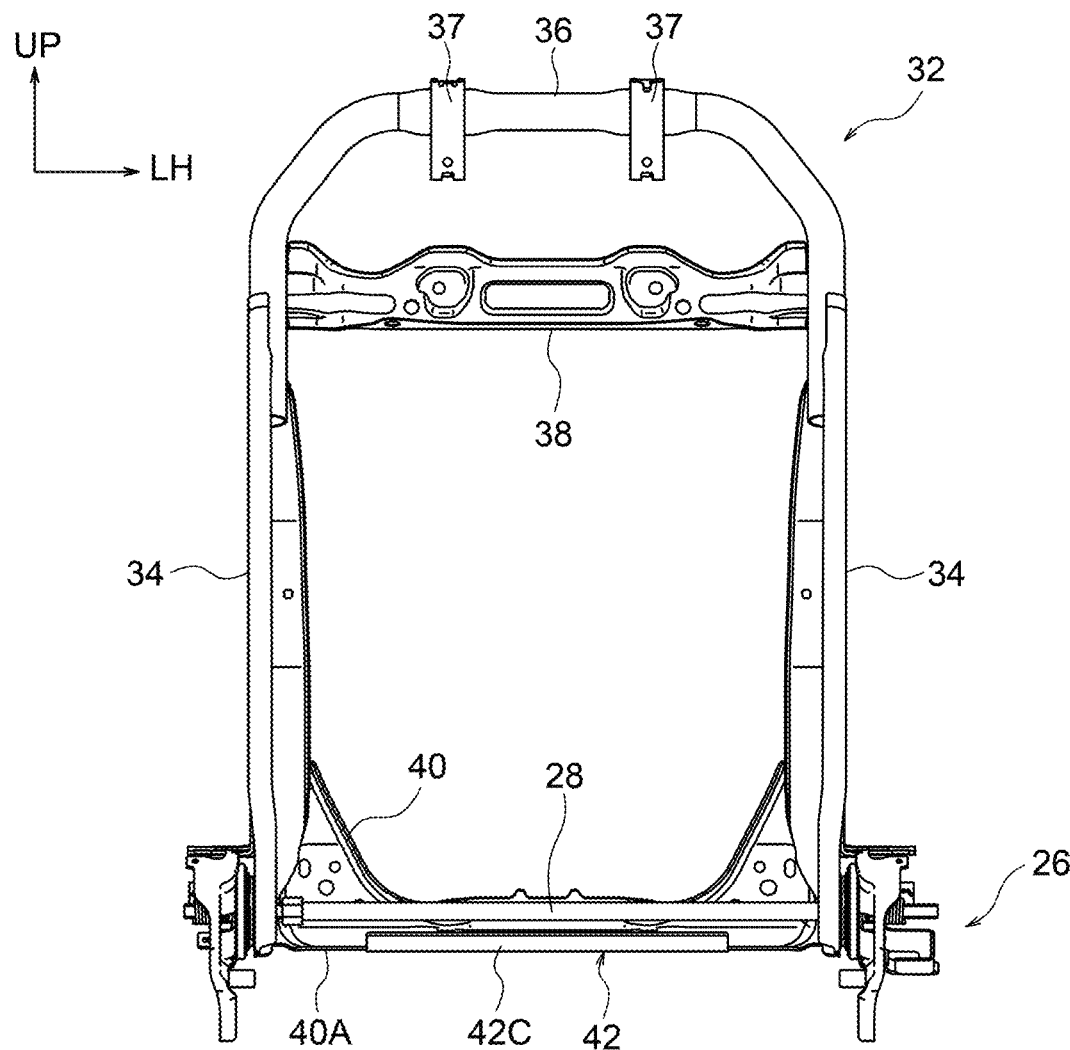
FIG. 2 is a face-on view illustrating a seatback frame according to an exemplary embodiment.
Figure 3:
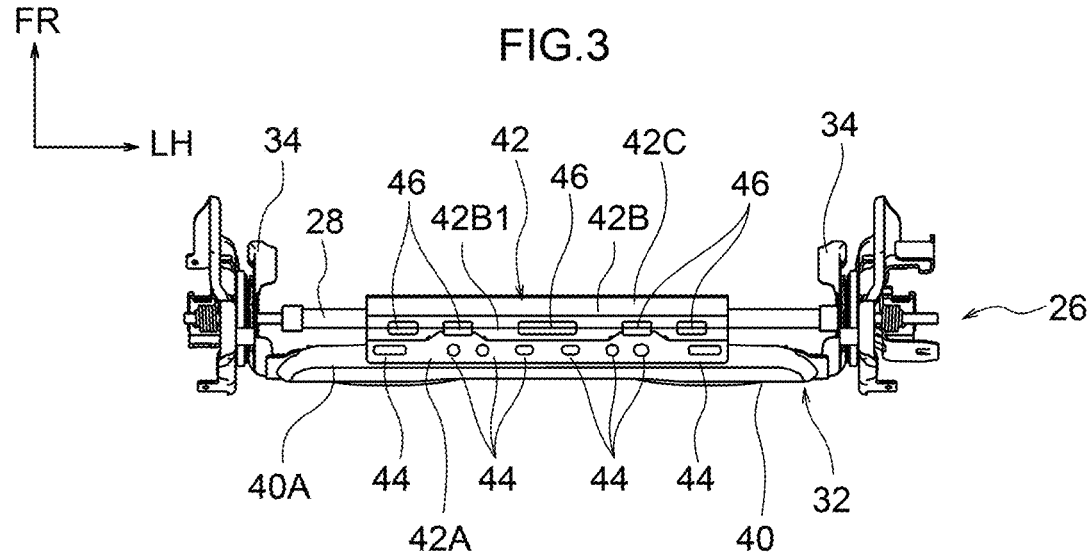
FIG. 3 is a bottom-face view illustrating the same seatback frame.

As illustrated in FIG. 1 to FIG. 3, the seatback frame 32 includes a left-right pair of side frames 34 extending in the seat up-down direction (the seatback 30 height direction) at left-right side portions of the seatback 30, an upper frame 36 spanning between upper end portions of the left and right side frames 34, an upper panel 38 fixed to the upper frame 36, a lower panel 40 spanning between rear end portions at lower end portions of the left and right side frames 34, and a sacrum support bracket 42 extending from a lower edge of the lower panel 40 toward the seat front side. The lower panel 40 corresponds to a "lower frame" of the present disclosure, and the sacrum support bracket 42 corresponds to a "sacrum support section" of the present disclosure.

The left and right side frames 34 are, for example, formed in an elongated shape by press forming sheet metal, and are disposed at an orientation such that their length directions are along the seat up-down direction and thickness directions are along the seat width direction. The lower end portions of the left and right side frames 34 are connected to the rear end portions of the left and right side frames 16 of the seat cushion frame 14 through the reclining mechanism 26 mentioned above. The reclining mechanism 26 is configured including a reclining rod 28 spanning between lower end portions of the left and right side frames 34. The reclining rod 28 is configured in a cylindrical shape having an axial direction along the seat left-right direction (seat width direction).

The upper frame 36 is, for example, formed by performing bending processing on a metal pipe, and is configured in a substantially inverted U-shape when viewed from the seat front face. Lower end portions of left-right side portions of the upper frame 36, where it extends in the seat up-down direction, are fixed to upper end portions of the left and right side frames 34 by a method such as welding. A left-right pair of headrest support brackets 37 is fixed to an upper end portion of the upper frame 36, where it extends in the seat left-right direction, with the headrest support brackets 37 employed for connecting to a non-illustrated headrest frame provided in the headrest 56. Note that the upper frame 36 may also have a configuration made from sheet metal.

The upper panel 38 is, for example, formed in an elongated shape by press forming sheet metal, and is disposed at an orientation such that its length direction is along the seat left-right direction and its thickness direction is along the seat front-rear direction. The two seat left-right direction end portions of the upper panel 38 are superimposed on seat up-down direction intermediate portions of left-right side portions of the upper frame 36 from the seat rear side, and fixed to the upper frame 36 by a method such as welding.

The lower panel 40 is, for example, formed in an elongated shape by press forming sheet metal, and is disposed at an orientation such that its length direction is along the seat left-right direction and its thickness direction is along the seat front-rear direction. The seat left-right direction two end portions of the lower panel 40 have, as an example, a height dimension that widens toward the seat upper side on progression toward the seat left-right direction outside. The seat left-right direction two end portions of the lower panel 40 are superimposed on lower end portions of the left and right side frames 34 from the seat rear side and fixed to the left and right side frames 34 by a method such as welding. The lower panel 40 is disposed at the seat rear side of the reclining rod 28. A lower flange 40A with a thickness direction in the seat up-down direction is formed at a lower end portion of the lower panel 40.

As illustrated in FIG. 1, a left-right pair of seatback springs 50 spans between the upper panel 38 and the lower panel 40. A lumber support plate 52 made from resin, for example, is attached to the seat front side of the left-right seatback springs 50. The lumber support plate 52 is disposed such that its thickness direction is in the seat front-rear direction, and is configured with a substantially ladder shape when viewed along the seat front-rear direction. The pad member of the seatback 30 is elastically supported from the seat rear side by the lumber support plate 52 and the left-right seatback springs 50, in a configuration in which a lumber region of a seated occupant is supported from the seat rear side by the lumber support plate 52.

As illustrated in FIG. 1 to FIG. 6, the sacrum support bracket 42 is formed in an elongated shape by press forming sheet metal, and is disposed at an orientation such that its length direction is along the seat left-right direction and such that a thickness direction of a main section thereof is along the seat up-down direction. The sacrum support bracket 42 includes, as an integrated body, a fixed portion 42A fixed to a lower surface of the lower flange 40A of the lower panel 40 (see FIG. 3), a forward extension portion 42B extending from the fixed portion 42A toward the seat front side, and a vertical extension portion 42C extending from the front edge of the forward extension portion 42B toward the seat upper side.

Figure 4:
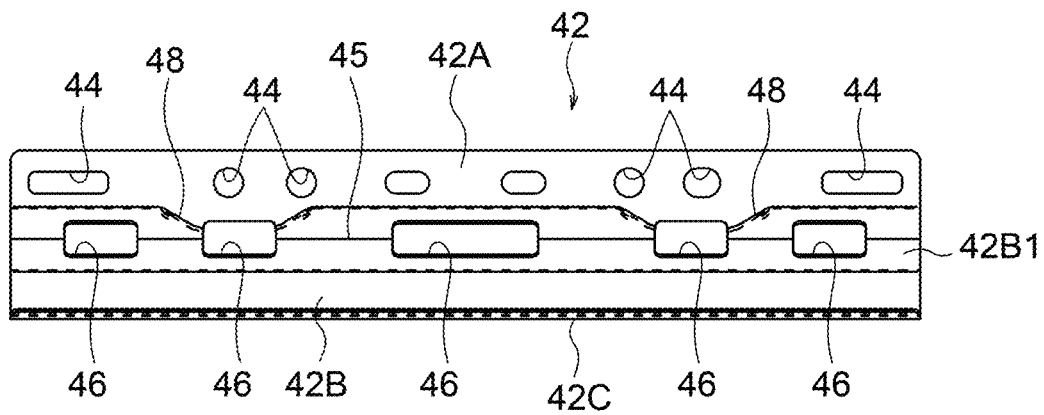
FIG. 4 is a plan view of a sacrum support bracket provided to the same seatback frame.
Figure 5:
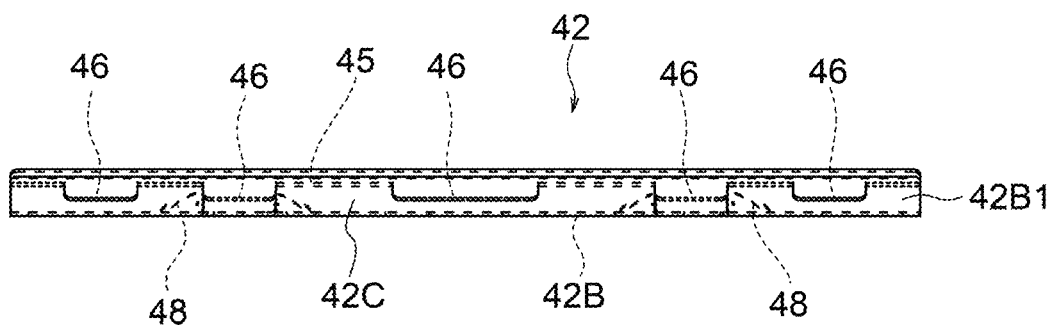
FIG. 5 is a face-on view of the same sacrum support bracket.
Figure 6:
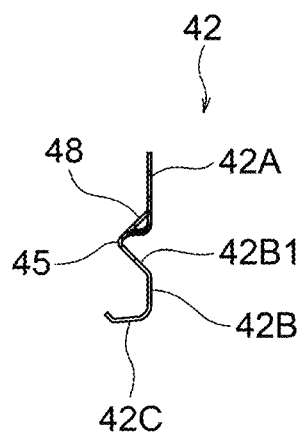
FIG. 6 is a side view of the same sacrum support bracket.

In FIG. 4 the fixed portion 42A is configured in an elongated plate shape with its length direction in the seat left-right direction and its thickness direction in the seat up-down direction. The fixed portion 42A is superimposed on the lower surface of the lower flange 40A of the lower panel 40 from the seat lower side. As an example, plural (eight in this example) welding through holes 44 are formed in the fixed portion 42A. The plural welding through holes 44 are arranged in a row spaced apart along the length direction of the sacrum support bracket 42. The fixed portion 42A is joined to the lower flange 40A of the lower panel 40 by welding at the hole edges of the plural welding through holes 44. Note that a configuration may be adopted in which the fixed portion 42A is fixed to the lower panel 40 by a method such as bolt fastening.

The forward extension portion 42B is integrated to and extends from a front edge of the fixed portion 42A toward the seat front side, and is configured in an elongated shape having a long side along the seat left-right direction. A seat front-rear direction intermediate portion of the forward extension portion 42B is configured by a bent portion 42B1 serving as a weakened portion. The bent portion 42B1 is formed by bending the seat front-rear direction intermediate portion of the forward extension portion 42B so as to configure a projection toward the seat upper side. The bent portion 42B1 is, as an example, configured in an inverted V-shape when viewed along the seat left-right direction. A ridge line 45 extending along the seat left-right direction is formed at an apex of the bent portion 42B1. The forward extension portion 42B is weakened (made weaker) to load from the seat front side at the bent portion 42B1. Locations on the forward extension portion 42B other than at the bent portion 42B1 are configured by a plate shape having a thickness direction along the seat up-down direction. Note that the seat front-rear direction intermediate portion of the forward extension portion 42B may alternatively be bent to form a bent portion configured by a projection toward the seat lower side. Moreover, the bent shape of the bent portion 42B1 is not limited to as described above, and may be modified as appropriate.

Plural (five in this example) through holes 46 are formed in the bent portion 42B1 (weakened portion) of the forward extension portion 42B so as to pierce the bent portion 42B1 in the seat up-down direction. The plural through holes 46 are, as an example, configured in substantially elongated rectangular shapes having a long side along the seat left-right direction when viewed from the seat up-down direction and arranged spaced apart along the seat left-right direction. The plural through holes 46 each pierce the apex and an up-down direction intermediate portion of the bent portion 42B1. The ridge line 45 at the apex of the bent portion 42B1 is divided by these through holes 46 into plural sections along the seat left-right direction. Note that, as illustrated in FIG. 4, as an example a left-right pair of indentations 48 are formed to a rear portion of the bent portion 42B1. The left-right indentations 48 are indented toward the seat front side in plan view. These indentations 48 are formed in order to avoid interference with a left-right pair of protrusions (omitted in the drawings) formed to a lower edge of the lower panel 40.

The vertical extension portion 42C extends from a front edge of the forward extension portion 42B toward the seat upper side. An upper end portion of the vertical extension portion 42C is bent diagonally toward the seat rear side. The vertical extension portion 42C is disposed opposing a sacral region of an occupant seated in the vehicle seat 10 from the seat rear side. The sacral region of the seated occupant is pressed by the vertical extension portion 42C of the sacrum support bracket 42 with a cover 54 and a non-illustrated pad member of the seatback 30 interposed therebetween, and is supported by the sacrum support bracket 42 from the seat rear side. Note that a configuration may be adopted in which a vertical extension portion extends toward the seat lower side from a front edge of the forward extension portion 42B.

The sacrum support bracket 42 configured as described above is disposed at the seat lower side with respect to the reclining rod 28. Stress is concentrated at the bent portion 42B1 serving as the weakened portion when excessive load is input to the sacrum support bracket 42 from the seat front side. This results in a configuration such that the sacrum support bracket 42 deforms (buckles) at the bent portion 42B1.

Operation and Advantageous Effects

Next, explanation follows regarding operation and advantageous effects of the present exemplary embodiment.

In the vehicle seat 10 configured as described above, the left and right side frames 34 of the seatback frame 32 extend in the seat up-down direction at the inside of left-right side portions of the seatback 30. The lower panel 40 spans between rear end portions at the lower end portions of the left and right side frames 34. The sacrum support bracket 42 extends toward the seat front side from the lower edge of the lower panel 40. The sacral region of a seated occupant is supported by the sacrum support bracket 42 from the seat rear side. Swaying of the seated occupant in the roll direction is accordingly suppressed from occurring during normal vehicle travel and the sitting posture of the seated occupant is maintained. The bent portion 42B1 (weakened portion) that is weakened by a load from the seat front side is provided to the sacrum support bracket 42. This means that the sacrum support bracket 42 deforms at the bent portion 42B1 by load being input from the sacral region of the seated occupant to the sacrum support bracket 42 during a vehicle rear-end collision. Energy due to the inertia of the seated occupant is absorbed thereby, and the moment imparted to the seatback frame 32 is reduced. As a result a phenomenon in which the seated occupant gradually rises diagonally toward the vehicle rear is suppressed from occurring, enabling the seated occupant to be protected.

Figure 7:
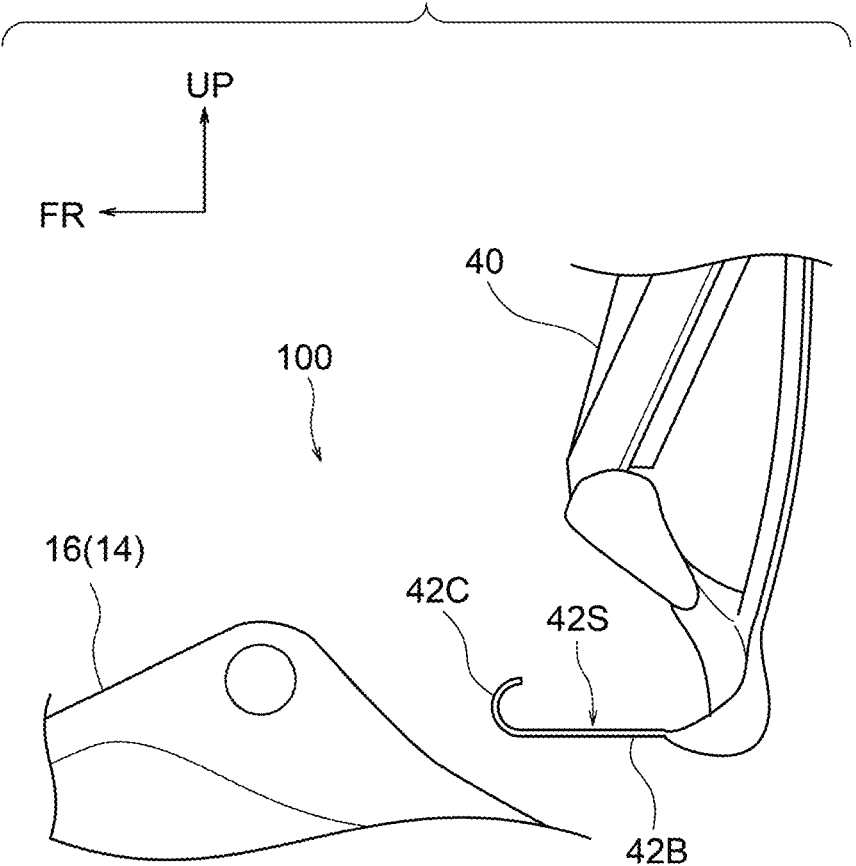
FIG. 7 is a side view illustrating a partial configuration of a vehicle seat according to a comparative example.
Figure 9:
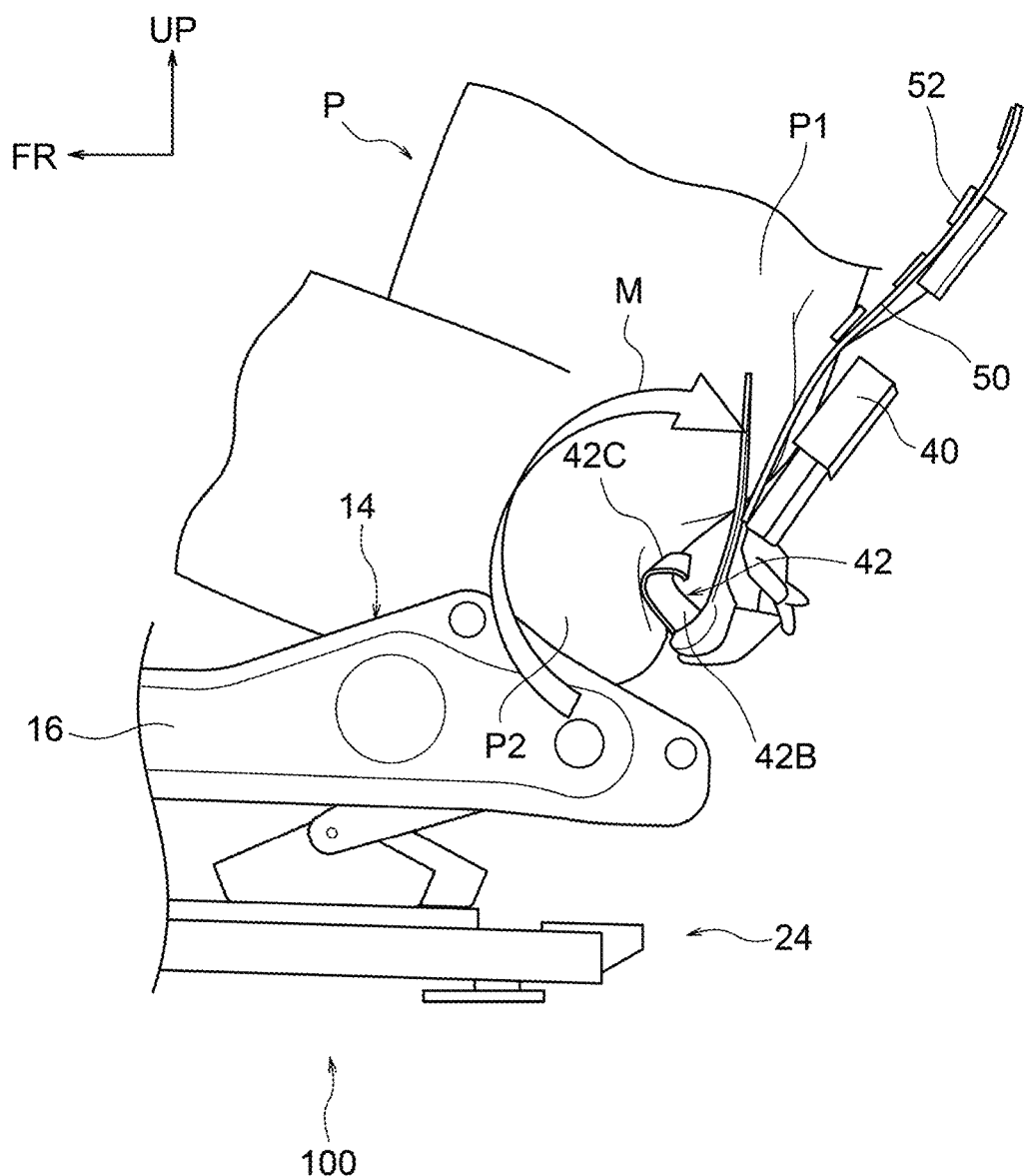
FIG. 9 is a side view corresponding to FIG. 8 and illustrating a state after the passage of a short period of time from the state illustrated in FIG. 8.
Figure 10:
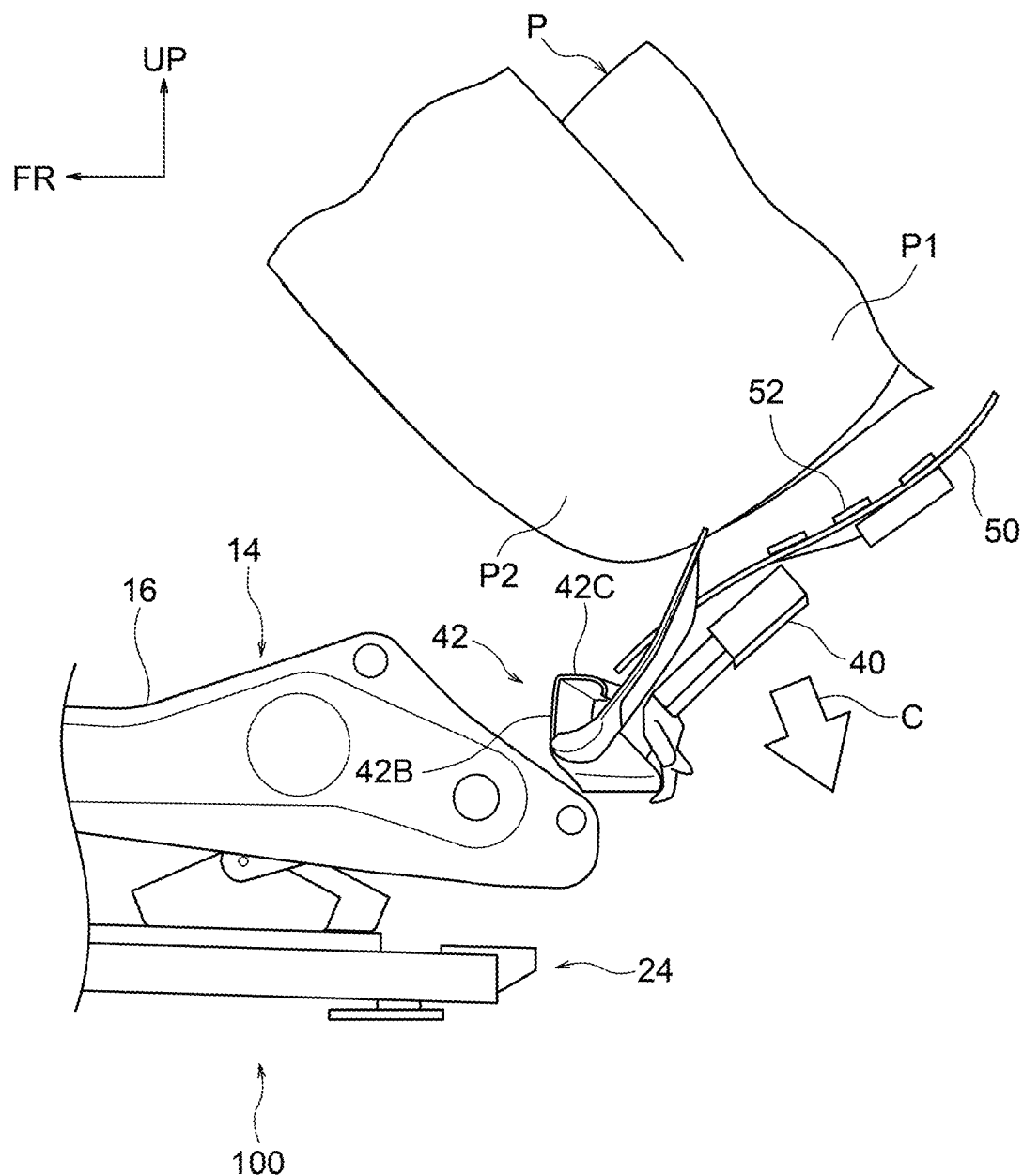
FIG. 10 is a side view corresponding to FIG. 8 and FIG. 9 and illustrating a state after the passage of a short period of time from the state illustrated in FIG. 9.
Figure 11:
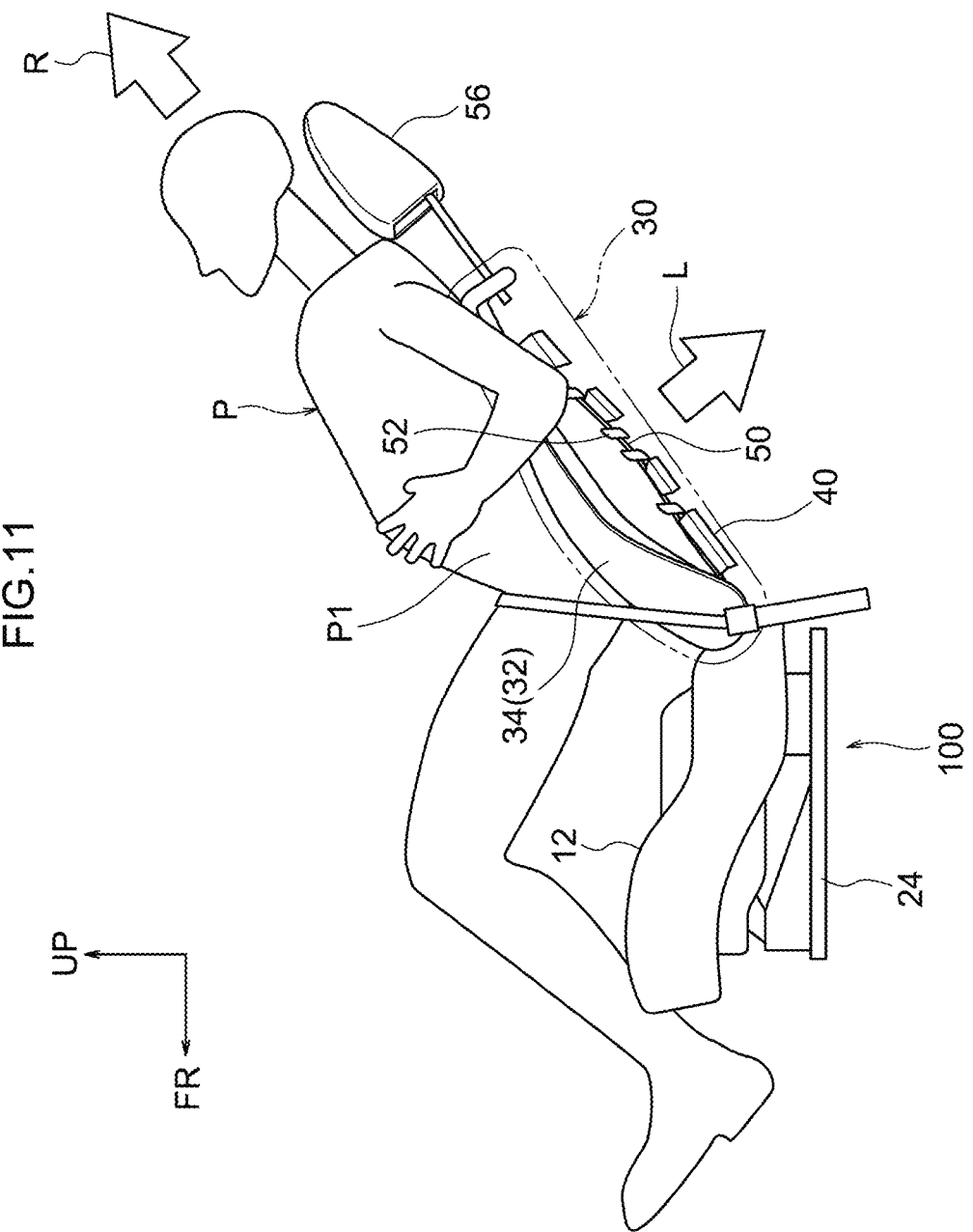
FIG. 11 is a side view illustrating states of a vehicle seat and a seated occupant in the state illustrated in FIG. 10.

The advantageous effect mentioned above will now be explained in detail using a vehicle seat 100 (comparative example) illustrated in FIG. 7 to FIG. 11. Note that FIG. 10 and FIG. 11 illustrate a state in which the seatback 30 has been greatly inclined toward the seat rear side by load imparted to the seatback 30 from the seated occupant P during a vehicle rear-end collision. In the vehicle seat 100, as illustrated in FIG. 7, a sacrum support bracket 42 is configured without a bent portion 42B1 to serve as a weakened portion, and the forward extension portion 42B is configured overall as a plate shape having a thickness direction along the seat up-down direction. Other configuration of the vehicle seat 100 is similar to that of the vehicle seat 10 according to the present exemplary embodiment.

Figure 8:
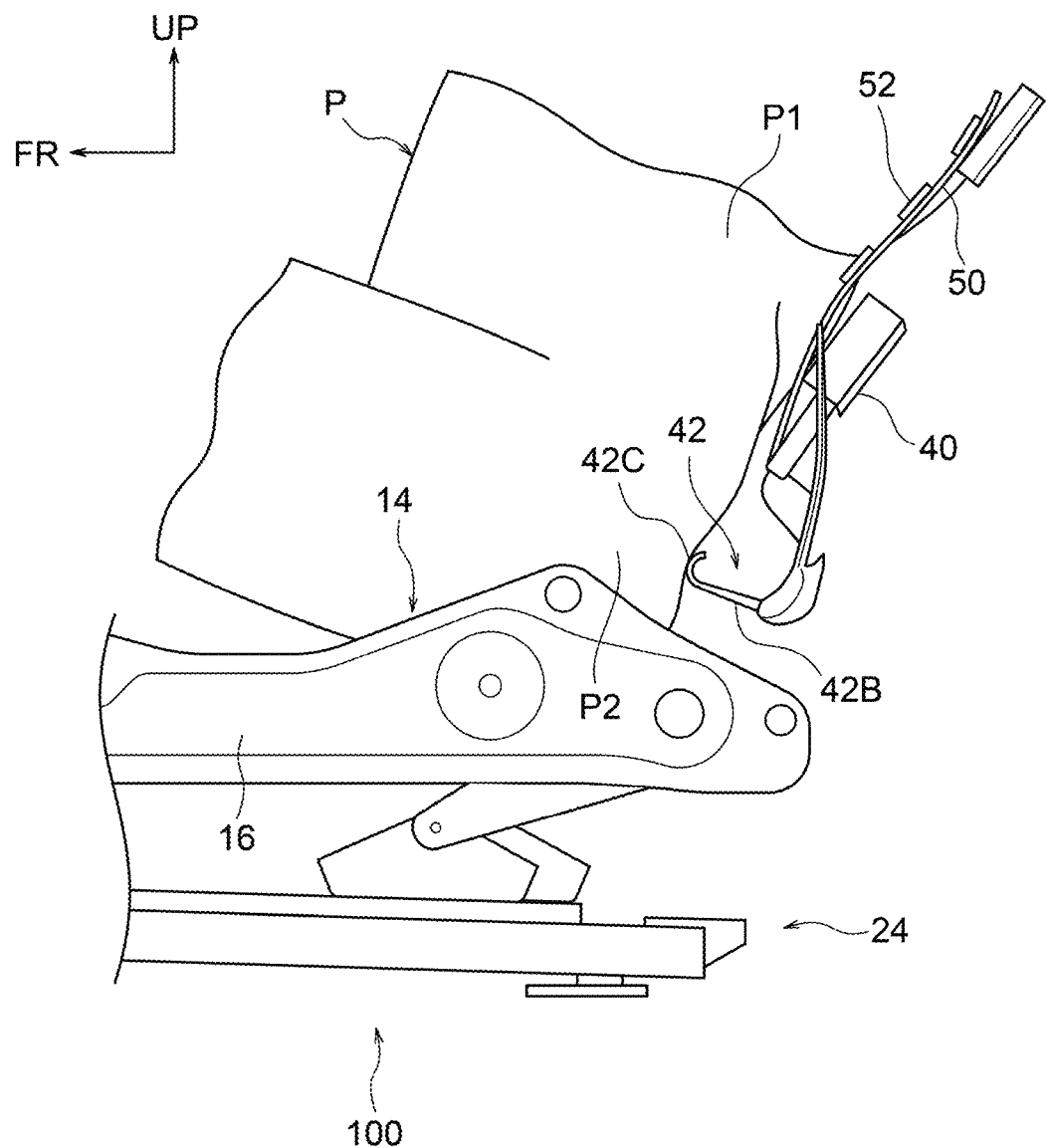
FIG. 8 is a side view illustrating a partial configuration of a vehicle seat according to a comparative example, and is a drawing illustrating an initial state in a vehicle rear-end collision.

When a vehicle installed with the vehicle seat 100 is involved in a rear-end collision, as illustrated in FIG. 8, the buttocks P2 of the seated occupant P moving under inertia toward the vehicle rear side collide with the sacrum support bracket 42, with a non-illustrated cover and pad member interposed therebetween, and excessive load is input to the sacrum support bracket 42 and the lower panel 40. As illustrated in FIG. 9, a clockwise moment M is generated on the lower panel 40 when viewed from the seat left side. As illustrated in FIG. 10, the lower panel 40 is deformed so as to been greatly inclined toward the seat rear side (see arrow C of FIG. 10) as a result thereof, and the lumber support plate 52 is greatly displaced toward the seat rear side with respect to the seatback frame 32. The support to the lumber region P1 of the seated occupant P from the lumber support plate 52 is weakened by such displacement of the lumber support plate 52. When this occurs, as illustrated in FIG. 10 and FIG. 11, the seatback 30 becomes in a state greatly inclined toward the seat rear side by the load from the seated occupant, and the seated occupant P gradually rises diagonally upward and toward the seat rear along the surface of the seatback 30 (see arrow R in FIG. 11). The load input to the seatback 30 is increased by such gradual rising, and the seatback 30 becomes further inclined toward the seat rear side (see arrow L of FIG. 11). There is accordingly room for improvement in the vehicle seat 100 from the perspective of raising the safety of the seated occupant P.

Figure 12:
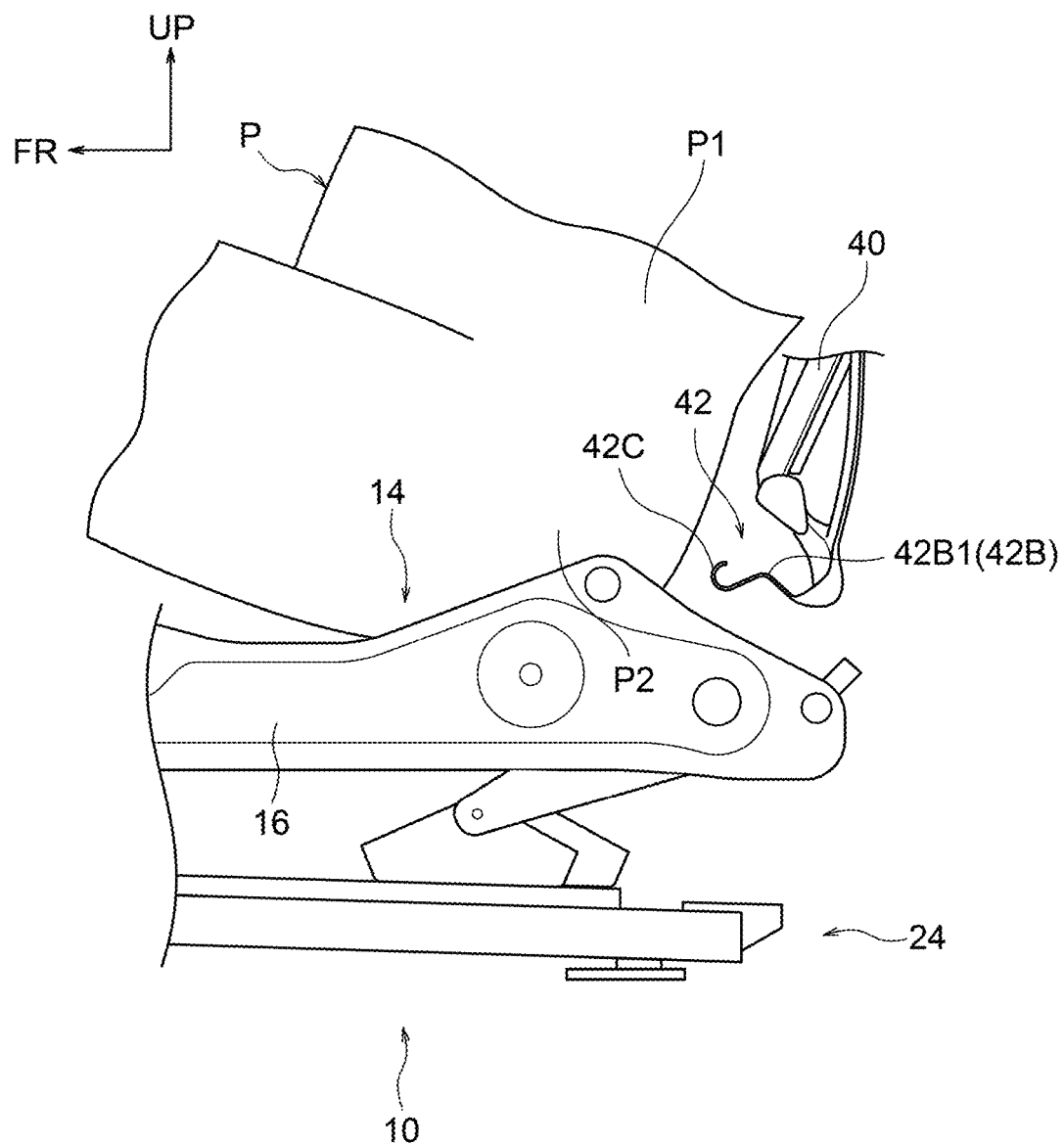
FIG. 12 is a side view illustrating a partial configuration of a vehicle seat according to an exemplary embodiment, and is a drawing illustrating an initial state in a vehicle rear-end collision.
Figure 13:
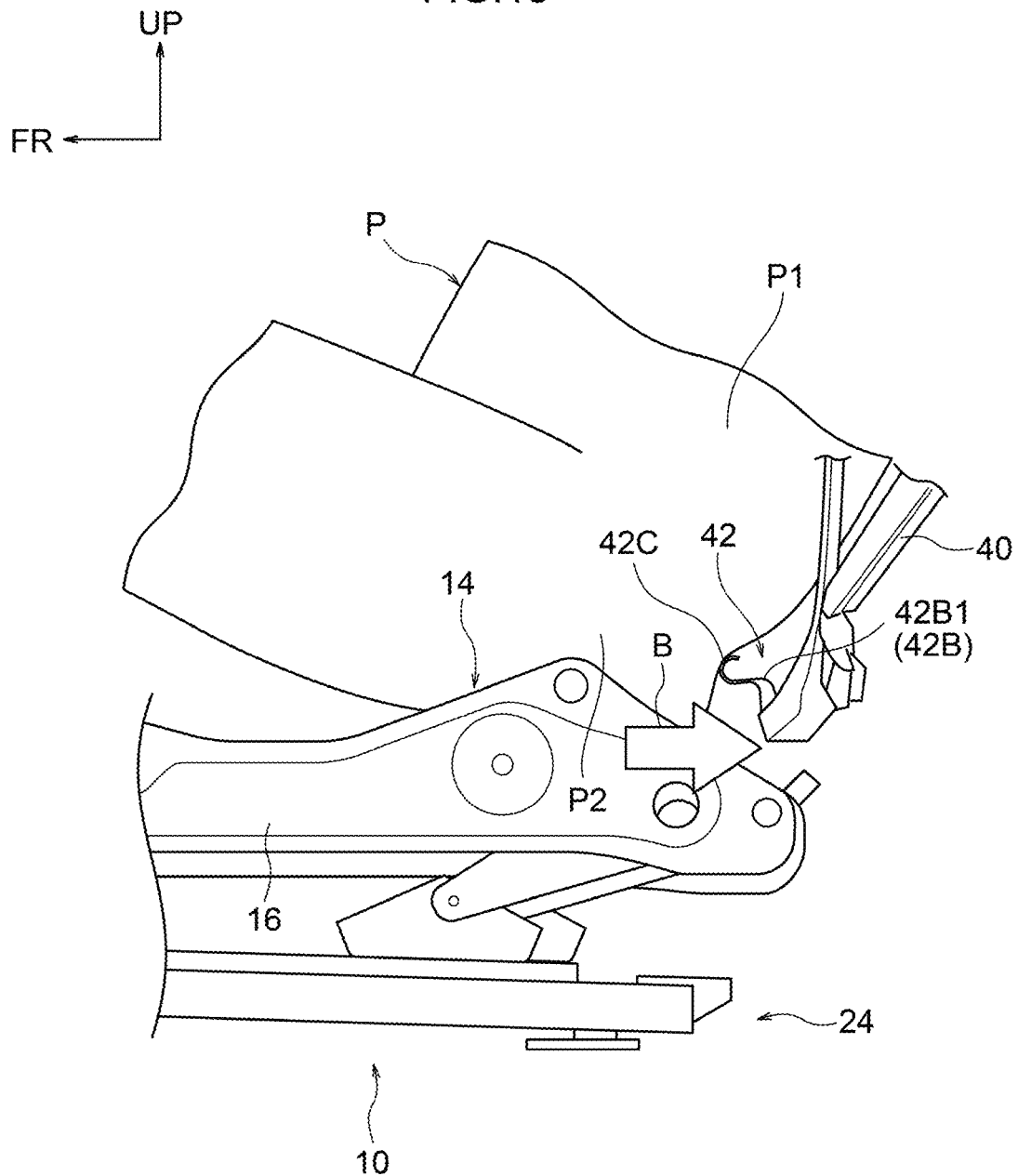
FIG. 13 is a side view corresponding to FIG. 12 and illustrating a state after the passage of a short period of time from the state illustrated in FIG. 12.
Figure 14:
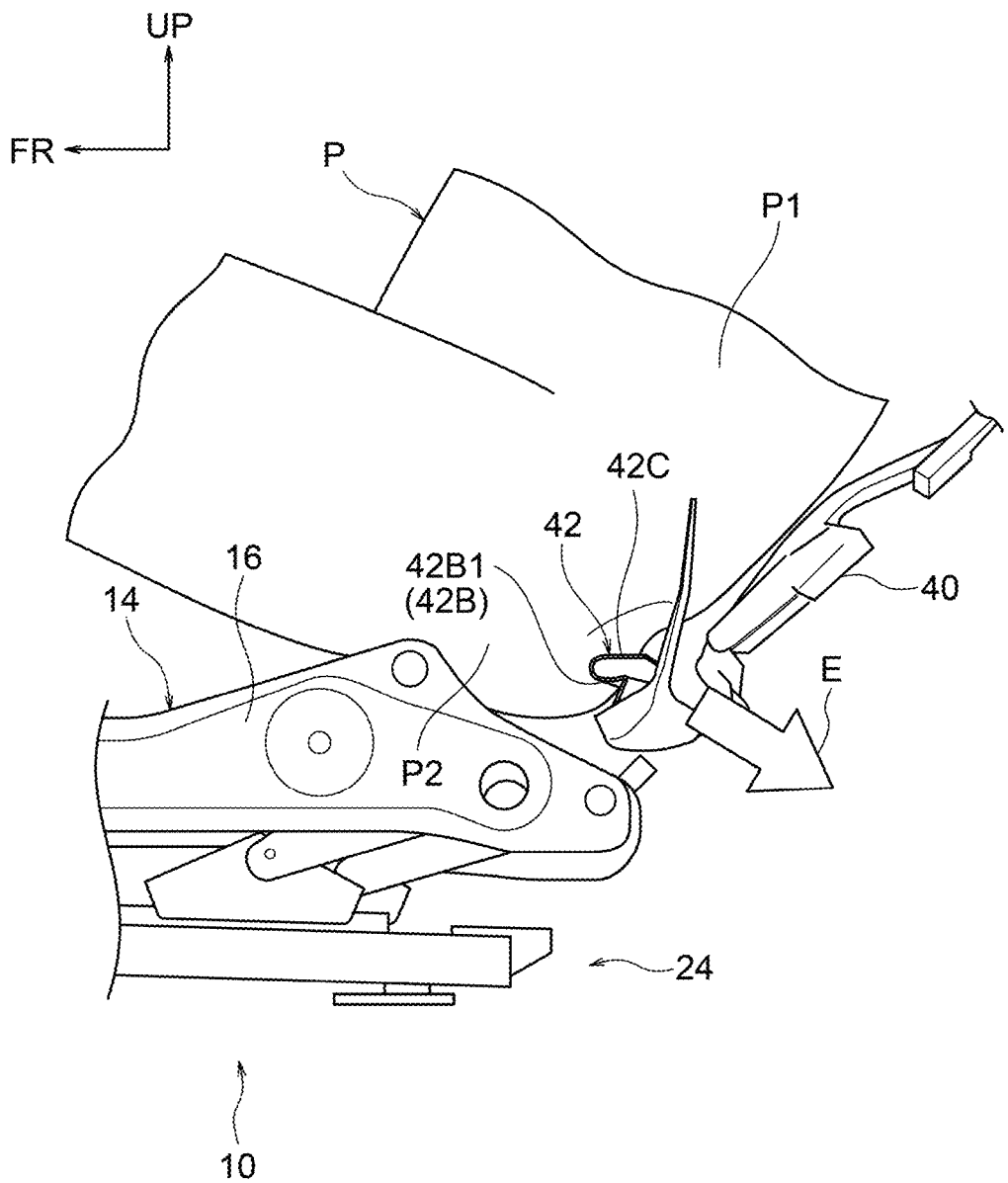
FIG. 14 is a side view corresponding to FIG. 12 and FIG. 13 and illustrating a state after the passage of a short period of time from the state illustrated in FIG. 13.
Figure 15:
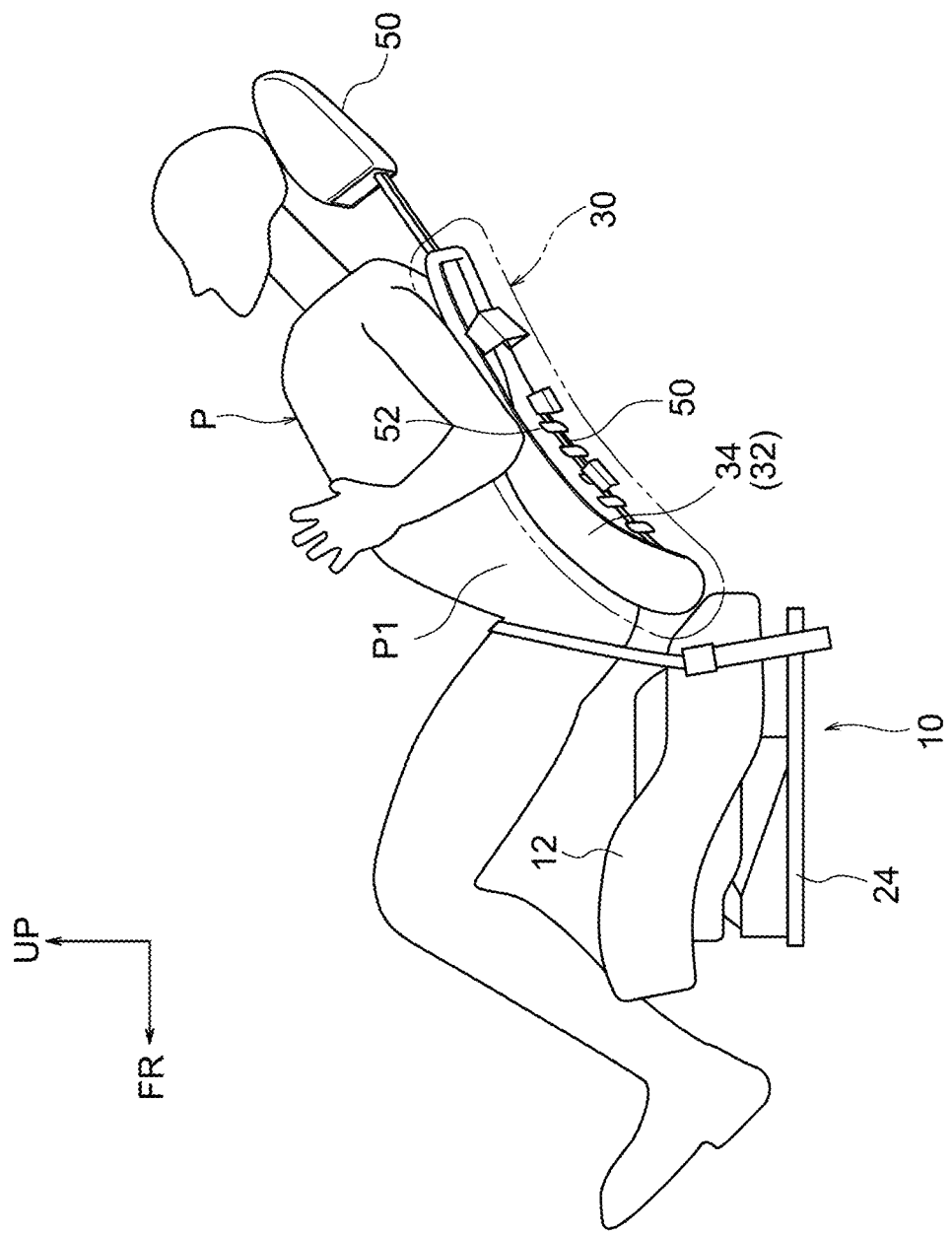
FIG. 15 is a side view illustrating states of a vehicle seat and a seated occupant in the state illustrated in FIG. 14.

Moreover, in the vehicle seat 10 according to the present exemplary embodiment, as illustrated in FIG. 12, the sacrum support bracket 42 disposed at the seat rear side of the buttocks P2 of the seated occupant P includes the bent portion 42B1 serving as a weakened portion. When a rear-end collision occurs in a vehicle installed with the vehicle seat 10, as illustrated in FIG. 13, the buttocks P2 of the seated occupant P moving under inertia toward the vehicle rear side collide with the sacrum support bracket 42, with a non-illustrated cover and pad member interposed therebetween, and the sacrum support bracket 42 deforms (buckles) at the bent portion 42B1 (see arrow B in FIG. 13). As a result thereof, the moment M on the lower panel 40 referred to above is not generated, and displacement of the lumber support plate 52 toward the seat rear side with respect to the seatback frame 32 is small. Moreover, the seated occupant P sinks into the seatback 30 (see arrow E of FIG. 14), and support from the lumber support plate 52 and the like is maintained to the lumber region P1 of the seated occupant P. As a result thereof, as illustrated in FIG. 14 and FIG. 15, the seated occupant P is suppressed from gradually rising diagonally upward toward the seat rear, and an increase in load input to the seatback 30 is avoided. The vehicle seat 10 is thereby able to raise the safety of the seated occupant P in comparison to the vehicle seat 100.

Moreover, in the present exemplary embodiment the sacrum support bracket 42 configured from sheet metal includes the fixed portion 42A and the forward extension portion 42B. The fixed portion 42A is fixed to the lower surface of the lower panel 40, and the forward extension portion 42B extends from the fixed portion 42A toward the seat front side. In the event of a vehicle rear-end collision, the bent portion 42B1 provided at the seat front-rear direction intermediate portion of the forward extension portion 42B buckles under load from the sacral region of the seated occupant P. Thus due to the bent portion 42B1 (weakened portion) being provided to the forward extension portion 42B included in the sacrum support bracket 42 made from sheet metal, the degrees of freedom for setting the shape and the like of the weakened portion is raised, and the deformation load of the weakened portion is easily adjusted.

Moreover, in the present exemplary embodiment the weakened portion provided to the seat front-rear direction intermediate portion of the forward extension portion 42B is the bent portion 42B1 bent so as to configure a projection toward the seat upper side. Stress due to load from the seated occupant P during a vehicle rear-end collision is concentrated at the bent portion 42B1, and the bent portion 42B1 deforms (buckles). The bent portion 42B1 accordingly acts as a weakened portion, and a weakened portion can be achieved with a simple configuration.

Moreover in the present exemplary embodiment, the plural through holes 46 are formed at the bent portion 42B1 (weakened portion) provided at the seat front-rear direction intermediate portion of the forward extension portion 42B so as to pierce the bent portion 42B1 in the seat up-down direction. The deformation load of the bent portion 42B1 can accordingly be easily adjusted by a setting change such as in the shape and number of these through holes 46.

Moreover, in the present exemplary embodiment the sacrum support bracket 42 includes the vertical extension portion 42C extending from the front edge of the forward extension portion 42B toward the seat upper side. The sacral region of the seated occupant P is supported by the front face of the vertical extension portion 42C such that discomfort of the seated occupant P is lessened.

Furthermore, in the present exemplary embodiment the reclining rod 28 spans between lower end portions of the left and right side frames 34 of the seatback frame 32. The sacrum support bracket 42 extending from the lower end portion of the lower panel 40 toward the seat front side is disposed at the seat lower side with respect to the reclining rod 28. The sacral region of the seated occupant P can be appropriately supported due to the sacrum support bracket 42 being disposed at this height.

Note that although in the above exemplary embodiment the weakened portion of the sacrum support bracket 42 (sacrum support section) is configured by the bent portion 42B1, there is no limitation thereto. For example, a configuration may be adopted in which the bent portion 42B1 is omitted, and the weakened portion is weakened by plural through holes 46 alone.

Moreover, although the lower panel 40 (lower frame) and the sacrum support bracket 42 (sacrum support section) is configured made from sheet metal in the above exemplary embodiments, there is no limitation thereto. For example, a configuration may be adopted in which the lower frame and the sacrum support section are manufactured from metal rod or pipe material.

Moreover, although in the configuration adopted in the above exemplary embodiments the bent portion 42B1 serving as a weakened portion is provided at a seat front-rear direction intermediate portion of the forward extension portion 42B of the sacrum support bracket 42 (sacrum support section), there is no limitation thereto. For example, a configuration may be adopted in which the weakened portion is provided to a fixing portion of the sacrum support section fixed to the lower panel 40 (lower frame). In such cases, for example, such a weakened portion may break when excessive load is imparted from the seat front side to the sacrum support section, with the sacrum support section configured so as to detach from the lower frame.

Various other modifications may also be implemented in the present disclosure within a range not departing from the spirit of the present disclosure. Obviously the scope of rights of the present disclosure is not limited by the above exemplary embodiments.

What is claimed is:

1. A seatback frame comprising:
   left and right side frames that extend in a seat up-down direction inside left and right side portions of a seatback of a vehicle seat;
   a lower frame spanning between lower end portions of the left and right side frames; and
   a sacrum support section that extends from a lower end portion of the lower frame toward a seat front side, that supports a sacral region of a seated occupant from a seat rear side, and that is provided with a weakened portion that is weakened by a load from the seat front side, wherein the sacrum support section is configured from a sheet metal and includes a fixed portion fixed to a lower surface of the lower frame and a forward extension portion extending from the fixed portion toward the seat front side, and wherein the weakened portion is provided at a seat front-rear direction intermediate portion of the forward extension portion or at the fixed portion.

2. The seatback frame of claim 1, wherein the weakened portion includes a bent portion where the seat front-rear direction intermediate portion of the forward extension portion is bent so as to configure a projection toward one side in the seat up-down direction.

3. The seatback frame of claim 1, wherein a through hole is formed at the weakened portion so as to pierce the weakened portion in the seat up-down direction.

4. The seatback frame of claim 1, wherein the sacrum support section includes a vertical extension portion extending from a front edge of the forward extension portion toward one side in the seat up-down direction.

5. A vehicle seat comprising:

a seat cushion including a seat cushion frame; and a seatback including the seatback frame of claim 1 in which each of the lower end portions of the left and right side frames is connected to a rear end portion of the seat cushion frame.

6. A seatback frame comprising:

left and right side frames that extend in a seat up-down direction inside left and right side portions of a seatback of a vehicle seat;

a lower frame spanning between lower end portions of the left and right side frames; and a sacrum support section that extends from a lower end portion of the lower frame toward a seat front side, that supports a sacral region of a seated occupant from a seat rear side, and that is provided with a weakened portion that is weakened by a load from the seat front side, wherein:

a reclining rod spans between the lower end portions of the left and right side frames; and the sacrum support section is entirely disposed at a seat lower side with respect to the reclining rod.

* * * * *